United States Patent [19]
Hoffmeister

[11] 3,950,020
[45] Apr. 13, 1976

[54] GRIPPING DEVICE
[75] Inventor: Bernhard Hoffmeister, Wilhelmshaven, Germany
[73] Assignee: Fried. Krupp Gesellschaft mit beschrankter Haftung, Essen, Germany
[22] Filed: Mar. 25, 1974
[21] Appl. No.: 454,296

[30] Foreign Application Priority Data
  Mar. 29, 1973  Germany............................ 2315662

[52] U.S. Cl................ 294/86 A; 176/30; 176/36 R; 294/86.15; 294/86.29
[51] Int. Cl.² .................... G21C 19/10; B66C 1/28
[58] Field of Search.......... 294/83 AA, 86 A, 86.12, 294/86.15, 86.29, 88, 90, 115; 214/18 N; 176/15, 27, 30, 33, 36 R, 36 C

[56] References Cited
UNITED STATES PATENTS

| | | |
|---|---|---|
| 1,749,869 | 3/1930 | Baumbach................... 294/86.29 X |
| 2,497,600 | 2/1950 | Grigsby................................ 294/115 |
| 3,401,739 | 9/1968 | Opletal............................ 294/88 X |
| 3,690,715 | 9/1972 | Vanlingen et al..................... 294/88 |
| 3,720,436 | 3/1973 | Suvanto et al........................ 294/88 |

FOREIGN PATENTS OR APPLICATIONS
1,223,120  8/1966  Germany.......................... 294/86 A Primary Examiner—Richard A. Schacher
Assistant Examiner—Johnny D. Cherry
Attorney, Agent, or Firm—Walter Becker

[57] ABSTRACT

A gripping device for gripping and moving control bars and fuel elements in core reactors in which a pair of grippers are mounted on one end of a gripper housing with independent actuators for the grippers in the housing. A lost motion connection between the housing and a lifting device is employed to lock the gripper in gripping position during raising and lowering movements of said housing while permitting selective operation of said grippers in lowered position of said housing.

4 Claims, 20 Drawing Figures

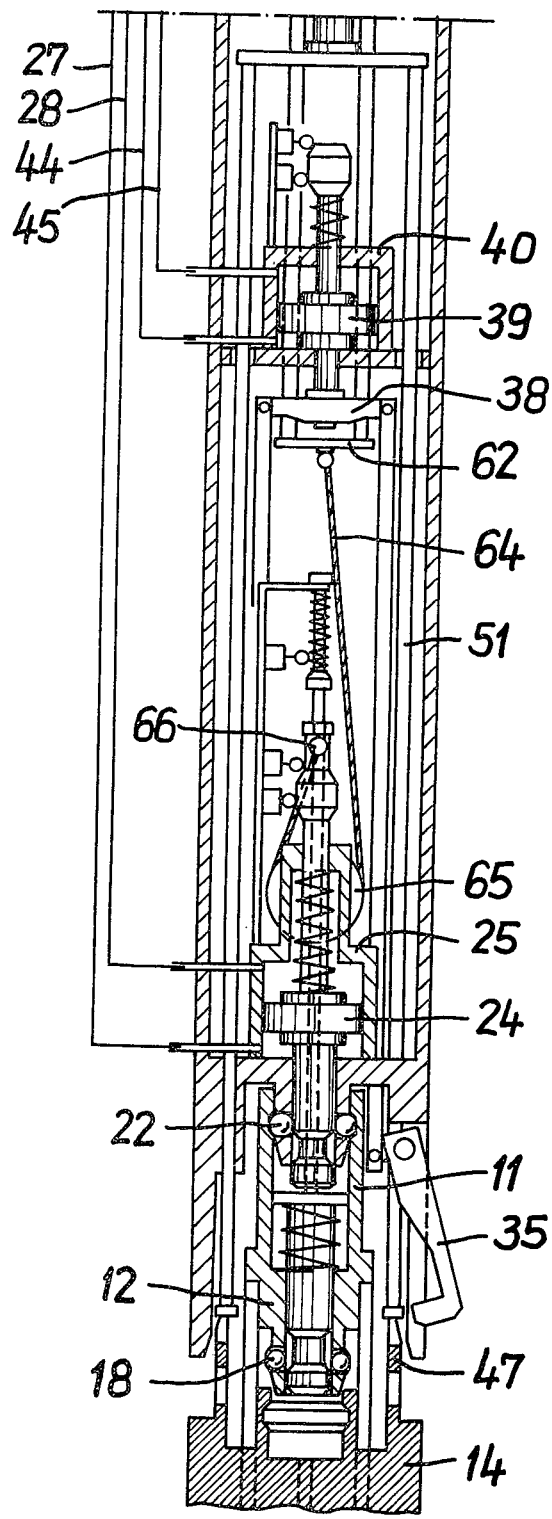

GRIPPING DEVICE

The present invention relates to a gripping device especially for use in connection with core reactors. It is an object of the present invention to provide a gripping device which may be used in connection with a core reactor for exchanging the fuel elements and the control bars, so that disorders will be avoided, especially when placing a gripper element on a fuel element or the like and also when withdrawing the gripper element from the fuel element.

Figure 1A:
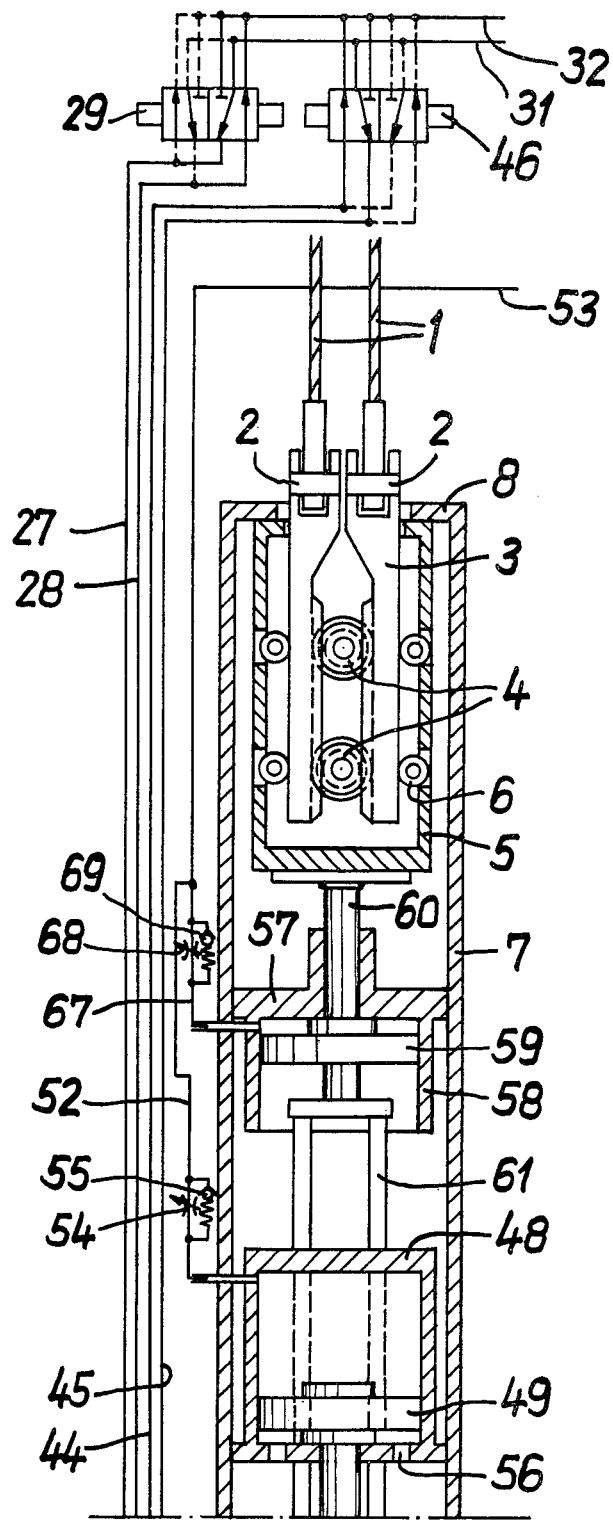
Figure 1B:
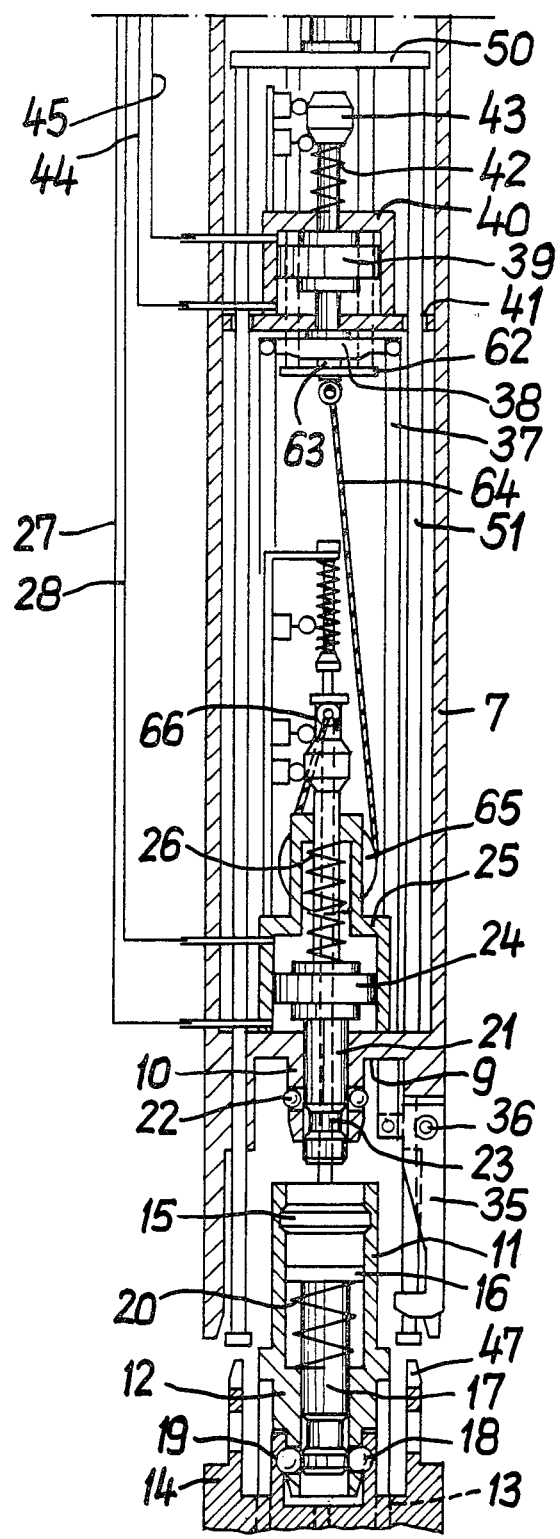

These and other objects and advantages of the invention will appear more clearly from the following specification in connection with the accompanying drawings, in which:

FIGS. 1a, 1b; 2a, 2b; 3a, 3b; 4a, 4b; 5a, 5b; 6a, 6b; 7a, 7b; 8a, 8b; 9a, 9b; 10a, 10b respectively illustrate in axial sections various positions for the fuel elements and control bars of a core reactor.

The gripping device according to the present invention is characterized primarily in that the blocking member for delaying its movement into blocking position is automatically connected to an element of a displacement device located in the gripper housing which element will during an upward movement of the load receiving body relative to the gripper housing press a medium through a throttle means.

The arrangement according to the present invention brings about the advantage that not only the fuel elements and the control bars or the like when being suspended on the grippers are reliably locked thereto but that also damages will be avoided which could occur when prior to the placing of the gripper housing upon a fuel element or the like or prior to the withdrawal of the gripper housing from such fuel element, the grippers would not be moved in time into their release positions.

Referring now to the drawings in detail, a cable winch is mounted on a non-illustrated charging carriage while two cables extend from said drum. Suspended on said two cables by means of joint bolts 2 are two racks 3 the teeth of which face each other. A pinion 4 meshes with said teeth. The axles of said pinion 4 are located in a pot-shaped load receiving body 5 which receives the racks 3. The racks are by means of guiding rollers 6 guided in said load receiving bodies 5. The pinions 4 bring about a load equalization between the two cables 1. The gripper housing 7 is a longitudinally extending hollow body of for instance square shaped cross section which is displaceably vertically guided in a hollow (non-illustrated) post which from the charging carriage extends downwardly. At the upper end, the gripper housing 7 has an inwardly extending flange 8 which for instance in the position of FIG. 1 rests on the load receiving body 5 so that the gripper housing 7 is supported by the load receiving body 5. At the lower end, the gripper housing 7 has a bottom 9 with a downwardly extending pivot 10. This pivot fits into the bore of a sleeve 11 which extends upwardly from a head 12 for a plurality of control bars 13.

This head is for instance in the position of FIG. 1 located on the head 14 of the fuel element which by means of bores receives the control bars 13 and in its turn is for instance in the position of FIG. 1 located in a position opening of the reactor core or of a bearing frame.

The bore of sleeve 11 has an annular groove 15. Below this groove a piston 16 is guided, the piston rod of which extends downwardly and forms a control rod 17 which is slideably guided in a vertical bore of a head 12. A collar extending from the head 12 downwardly is provided with radial bores which contain supporting balls 18. In the position shown for instance in FIG. 1, the lower end of the control rod 17 is located ahead of the radial bores so that the supporting balls 18 project beyond the collar and engage an annular groove of a collar which extends upwardly from the fuel element head 14. In this way, the head 12 of the control bars 13 is coupled to the head 14 of the fuel element. The control rod 17 is above its lower end provided with an annular groove 19. When this groove 19 due to a downward movement of the piston 16 moves behind the radial bores, the supporting balls 18 can leave the annular groove 19 so that the head 12 of the control bars 13 are disengaged from the head 14 of the fuel element. A pressure spring 20 urges the piston 16 upwardly.

A control rod 21 is displaceably guided in a bore of the pivot 10. This rod 21 is with the lowermost position shown in FIG. 1 located behind the radial bores which are provided in the pivot 10 and contain supporting balls 22 adapted to engage the annular groove 15 whereby the head 12 of the control bars 13 are coupled to the gripper housing 7. The control rod 21 has an annular groove 23 which when the control rod 21 moves upwardly, moves behind the radial bores of the pivot 10 so that the supporting balls 22 can leave the annular groove 15 as a result of which the gripper housing 7 is disengaged from the head 12 of the control rods.

The control rod 21 is provided on a piston 24 of a pneumatic power system, the cylinder 25 of which is connected to the bottom 9. A compression spring 26 urges the piston 24 downwardly. Compressed air conveying conduits 27, 28 are connected to the cylinder chambers above and below the piston 24. These conduits 27, 28 may by means of a shift-over valve 29 be connected selectively to one of two compressed air conveying conduits 31, 32. Conduit 31 is connected to a compressed air source or bottle 33 (FIG. 10) in which a pressure of 6 atmospheric pressure prevails, whereas the other conduit 32 is connected to a compressed air supply or bottle 34 in which a pressure of 2 atmospheres above atmospheric pressure prevails.

At the lower end of the gripper housing 7 on opposite sides thereof, gripper pawls 35 are pivotally mounted on horizontal joint bolts 36. From each gripper pawl at the level of the joint bolt 36 there is provided a short leg which is engaged by a bar 37. The bars pertaining to two gripper pawls are within the gripper housing 7 extending upwardly to a certain extent and are connected to the ends of a transverse head or beam 38 which is located at the lower end of a piston rod starting from a piston 39 of a further pneumatic power operable device. The cylinder 40 of this device is located on an intermediate bottom 41 of the gripper housing 7. A compression spring 42 rests on the upper cover of the cylinder 40 and on a cam piston 43 which is mounted on a bar extending from the piston 39 upwardly out of the cylinder 40. Compressed air conveying conduits 44, 45 are connected to the cylinder space located above and below the piston 39. The conduits 44 and 45 lead to a shift-over or reversing valve 46 by means of which the conduits 44, 45 can alternately be connected to one of the two conduits 31, 32.

The gripper pawls 35 are adapted to engage openings of fingers 47 which extend upwardly from the fuel element head 14.

The gripper housing 7 has an additional intermediate bottom arranged in spaced relationship to and above the cylinder 40. This intermediate bottom is provided with a cylinder 48 located thereon and closed at the top. Reciprocably mounted in said cylinder is a piston 49, the downwardly directed piston rod of which has a transverse head 50. From the ends of the transverse head 50 there extend downwardly feeler members 51 which extend through bores into the intermediate bottom 41 and pass with play through the lowermost bottom 9. In the lowermost position of the piston 49 for instance in the position as shown in FIG. 1, said feeler members 51 have their lower ends extended downwardly to a greater extent than the gripper pawls 35 while for instance in the position of FIG. 1, said feeler members 51 are located above the fingers 47.

Connected to the cylinder 48 closely below its upper cover is a compressed air conveying conduit 52 which leads into a conduit 53 originating at the compressed air bottle 34. The compressed air conduit 52 comprises a throttling member 54. Parallel to the member 54 there is provided a check valve 55 which is located in a bypass line connected to the conduit 52. Valve 55 permits the air to pass through only in the direction toward the cylinder 48. The cylinder space below the piston 49 is through bores 56 in the intermediate bottom supporting the cylinder in communication with the atmosphere.

Above the cylinder 48 and in spaced relationship thereto there is provided an intermediate bottom 57 of the gripper housing 7 while at the bottom side of said intermediate bottom 57 there is provided a cylinder 58 which opens in downward direction. Reciprocally mounted in said cylinder 58 is a piston 59 which by means of a bar 60 extending through a bore of the intermediate bottom 57 is connected to the rod receiving body 5. From the piston 59 downwardly extend two pairs of bars 61 which by means of a transverse head or beam are connected to the piston rod. These bars extend through bores in the cylinder bottom which support the cylinder 48 in the intermediate bottom 41. The bars extend below the intermediate bottom 41 to such an extent that a yoke 62 arranged in the lower ends engages from below an abutment 63 provided on the transverse head 38.

Connected to the yoke 62 is one end of a cable 64 which in the form of a loop passes around a pulley 65 mounted on an extension of cylinder 25, and from here passes upwardly to a connecting area 66 on a bar which from the piston 24 extends upwardly out of the cylinder 25.

Connected to the cylinder 58 closely below the intermediate bottom 57 is a compressed air conveying conduit 67 which leads into the conduit 53 and comprises a throttling member 68. In a bypass line connected to the conduit 67 and parallel to the throttling member 68, there is provided a check valve 69 which permits air to pass in one direction only namely in the direction toward the cylinder 58 in which it may be assumed that by means of the gripping device, it is intended to pull the fuel element with head 14 and control bars 13 out of the positioning bore for instance in the core of the reactor. To this end, according to FIG. 1, the gripper housing 7 which rests by means of flange 8 on the load receiving body suspended on the cables 11 is lowered coaxially with regard to the fuel element head 14. During this operation, first the piston 24 occupies its lower end position while the piston 39 is in its upper end position although according to FIG. 1, the reversing valves 29 and 46 are so set that the higher pressure from conduit 31 acts from below upon the piston 24 and from above upon the piston 39. The lower end position of the piston 24 corresponds to the closing position of the rod gripper comprising the supporting balls 22, whereas the upper end position of the piston 39 corresponds to the closing position of the fuel element gripper formed by the gripper pawls 35. However, the pistons 24 and 39 are against the air acting thereupon and having the higher pressure (6 atmospheres above atmospheric pressure) held in the mentioned position by the locking device which contains the yoke 62.

It should be kept in mind that the gripper housing 7 with the parts located therein has such a high weight that due to the air pressure of two atmospheres above atmospheric pressure, which prevails in the cylinder 58 above the piston 59, the housing 7 is not lifted relative to the piston 59 but rests by means of its flange 8 on the load receiving body 5. Since thus the piston 49 —relative to the gripper housing 7— occupies its uppermost position, the yoke 62 is held in its uppermost position in which it forces the transverse head 38 resting thereon by means of the abutment 63 to occupy the uppermost possible position. Consequently the piston 39 is against the resistance of the compressed air of 6 atmospheres above atmospheric pressure prevailing thereabove followed to stay in its uppermost end position. This, however, means that the bars 37 are pulled upwardly and consequently the gripper pawls 35 are with their lower ends pivoted into their closing position shown in FIG. 1.

Furthermore, one end of the cable 64 is by the yoke 62 pulled upwardly as far as possible and consequently the other end of the cable at the connecting point 66 is pulled downwardly as far as possible. Consequently, the piston 24 is against the resistance asserted by the compressed air of 6 atmospheres above atmospheric pressure acting upon its lower side held in its lowermost position. This, however, means that the guiding bar 21 does not permit the supporting balls 22 to leave the radial bores in pivot 10. This corresponds to the closing position of the bar gripper.

If, however, the gripper housing 7 is further lowered from the position of FIG. 1, the feeler member 51 has its lower ends hit upon the fingers 47 which in response to a further lowering of the gripper housing 7 are relative thereto moved upwardly.

Figure 2A:
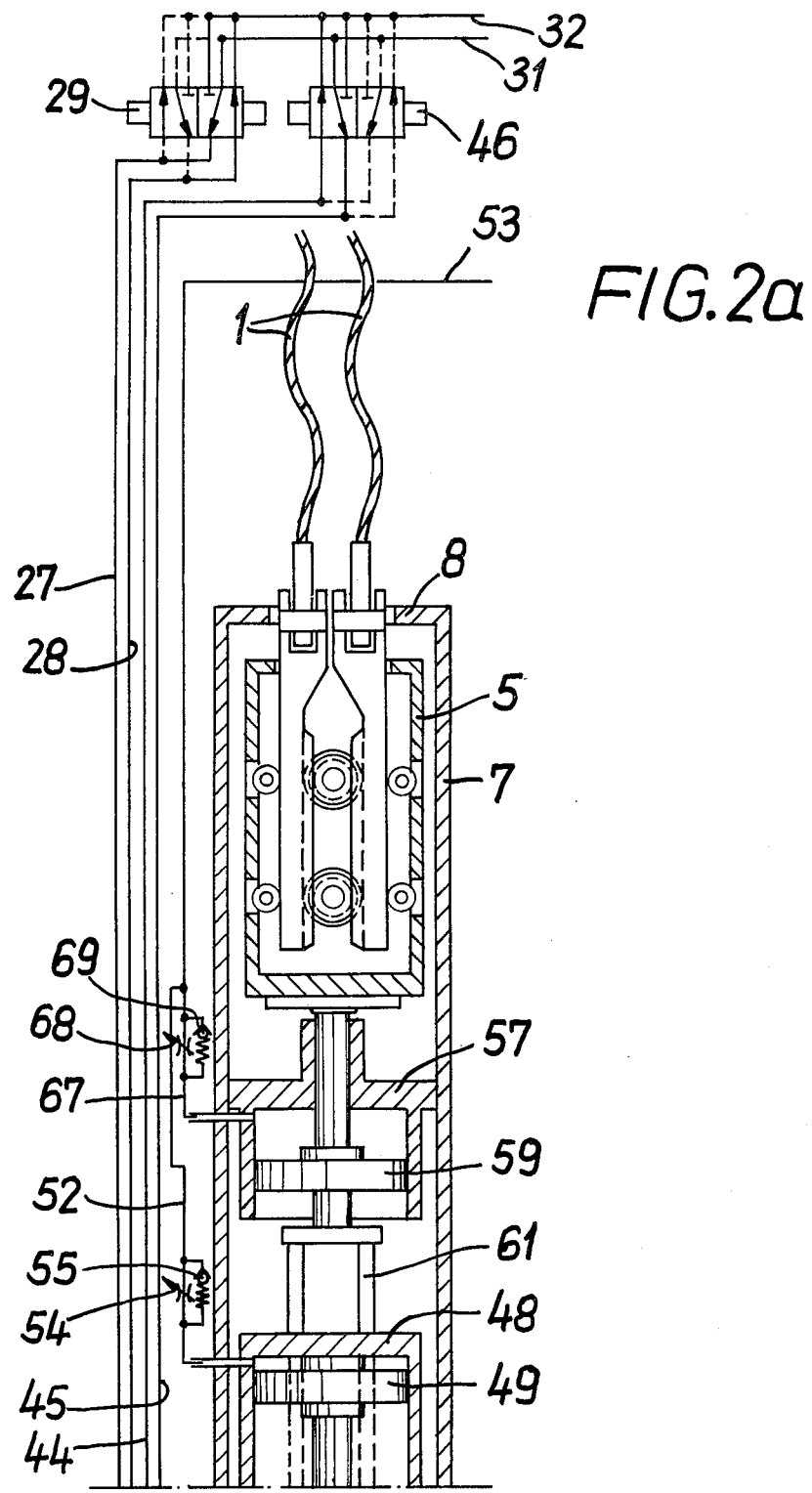
Figure 2B:
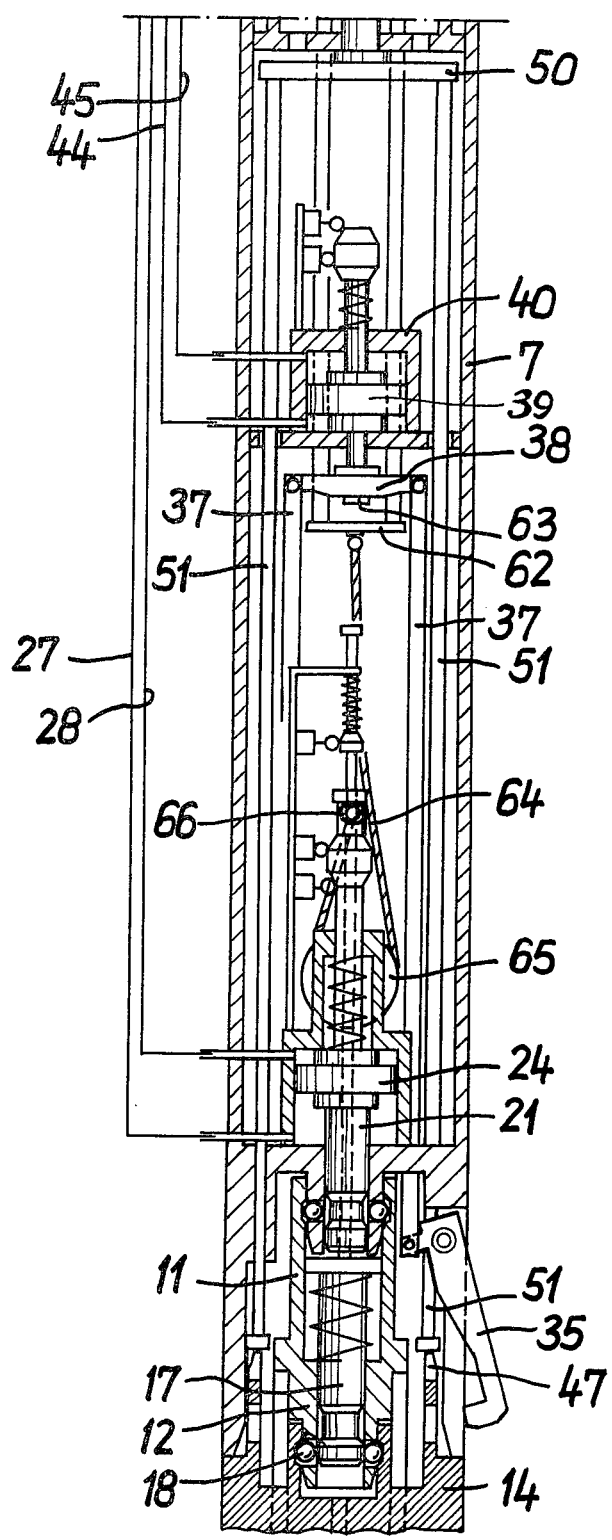

Consequently by means of the transverse head 50, the piston 49 is moved upwardly so that the piston 49 will press air from the cylinder 48 through the throttling member 54. Since in view of the throttling effect air will collect below the lower cover of the cylinder 48 and will increase the air pressure, the weight of the gripper housing 7 and the parts therein will to an ever increasing extent through the intervention of the air cushion above the piston 49 be supported by the feeler members 51 resting upon the fingers 47. Consequently, the cables 1 become slack as shown in FIG. 2. Therefore, the load receiving body 5 moves with its piston 59 in downward direction while in the upper portion of cylinder 58, compressed air of 2 atmospheres above atmospheric pressure flows from the conduits 53 and 67 through the check valve 69 without any material delay. Simultaneously, the transverse head 38 moves downwardly into the position shown in FIG. 2. Consequently, the piston 39 is no longer prevented by the abutment 63 from moving into the lower end position due to the air pressure of 6 atmospheres above atmospheric pressure, which prevails in the upper portion of the cylinder 40. As a result thereof, the gripper pawls 35 are through the intervention of the bars 37 likewise moving downwardly pivoted into their release position according to FIG. 2.

Inasmuch as this occurs as long as the gripper housing 7 due to the delay of the escape of air from the cylinder through the throttling element 54 is prevented by the feeler members 51 which rest upon the fingers 47, from completely resting upon the fuel element head 14, the gripper pawls 35 reach their disengagement position prior to the time at which during a further lowering of the gripper housing 7 they would impact upon the fingers 47.

Due to the downward movement of yoke 62, the cable 64 connected to said yoke 62 is slackened so that the connecting area 66 for the cable 64 on the rod extending upwardly from piston 24 can move in upward direction. Consequently the piston 24 will now no longer be prevented from moving under a pressure of 6 atmospheres above atmospheric pressure in the lower portion of the cylinder 25 to its upper end position according to FIG. 2 against the thrust of the pressure spring 26. Consequently, the control bar 21 will be lifted into that position of FIG. 2 in which the annular groove 23 occupies a position opposite to the radial bores which contain the supporting balls 22. Consequently, the supporting balls 22 will be able to escape into the annular groove 23 when the pivot 10 immerses into the bore of sleeve 11.

Figure 3A:
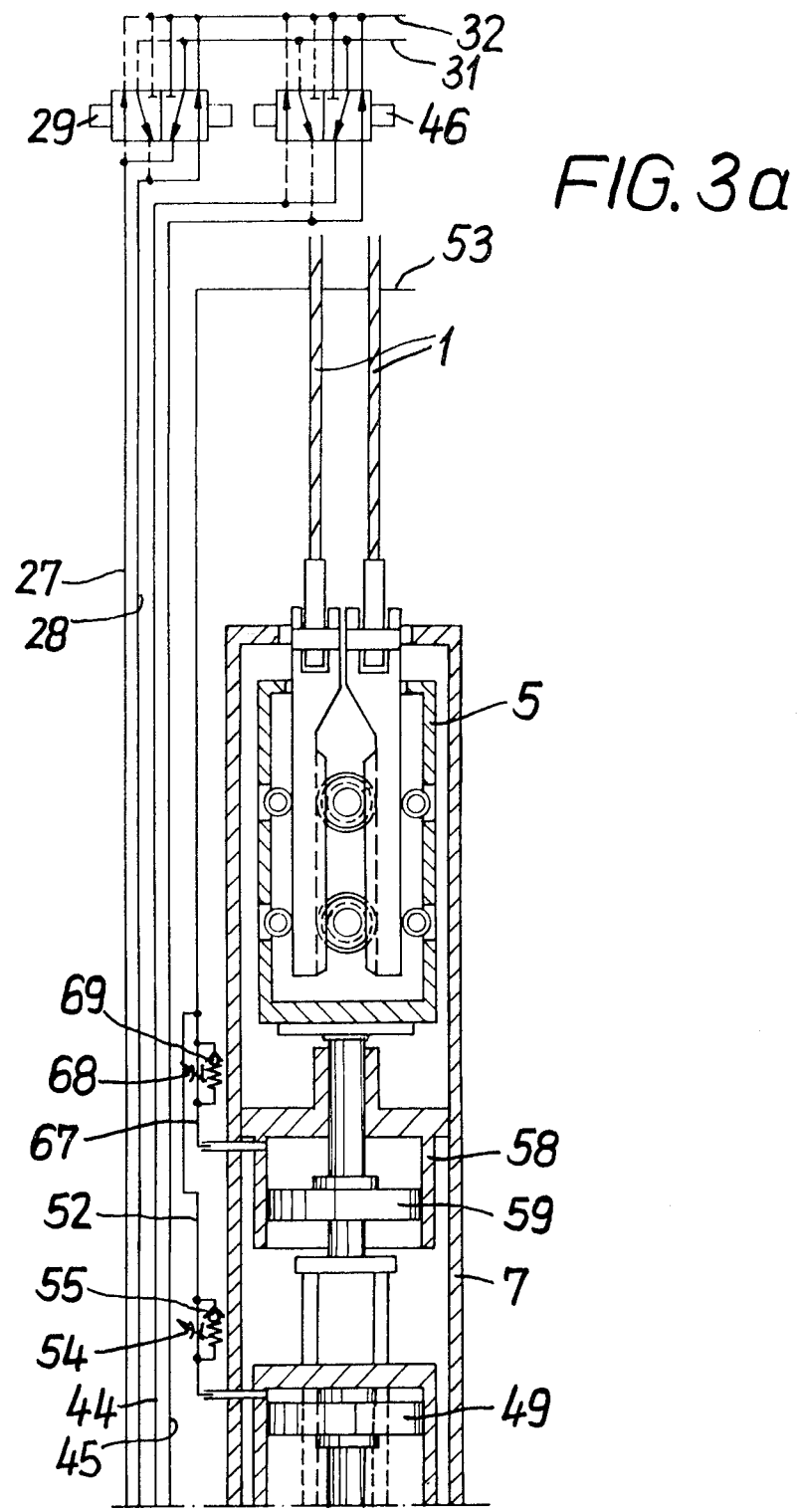
Figure 3B:
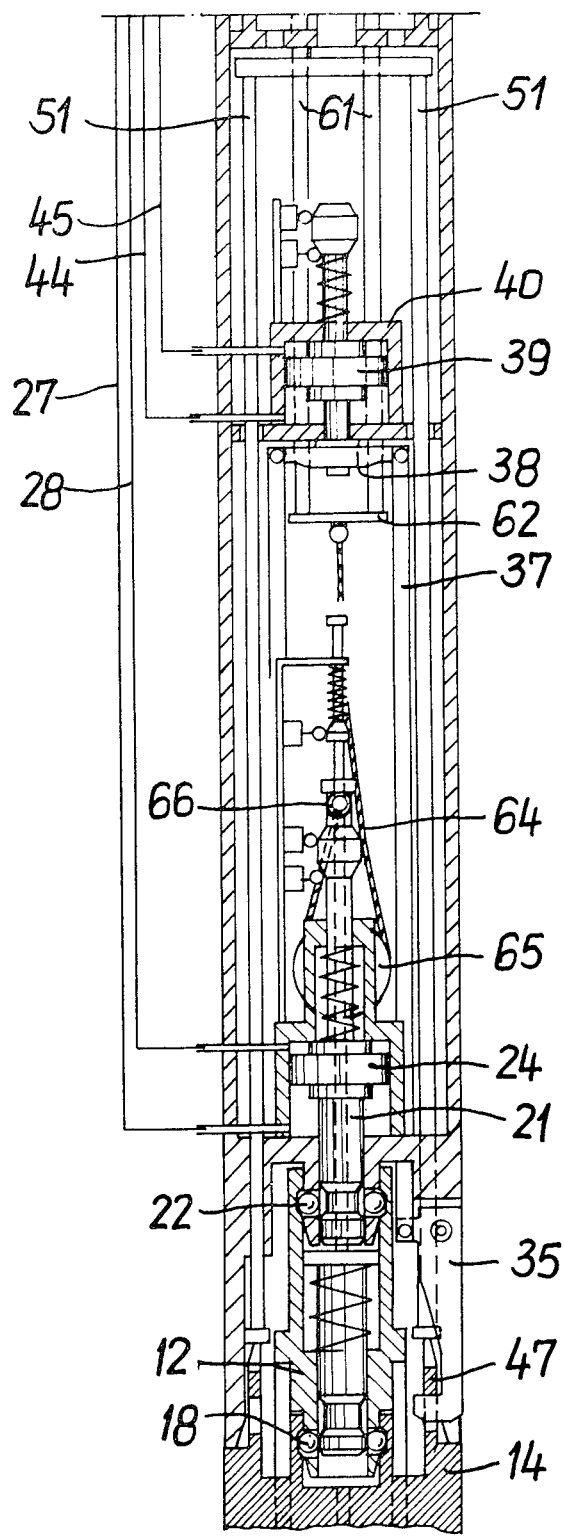

FIG. 2 shows the condition in which the gripper housing 7 has been finally placed down onto the fuel element head 14 by means of forwardly extending fingers. The gripper pawls 35 will in this instance have been pivoted outwardly into their disengaging position, and the supporting balls 22 of the rod gripper will have entered the region of the annular groove 15. If now the fuel element together with the control bars therein is to be pulled out of the position bore, the switch-over valve 46 according to FIG. 3 is so changed that compressed air of 6 atmospheres above atmospheric pressure enters from conduit 44 into the lower portion of cylinder 40, whereas compressed air of 2 atmospheres above atmospheric pressure escapes from the upper portion of cylinder 40 through conduit 45. Accordingly, the piston 49 moves upwardly, and the gripper pawls 35 are through the intervention of bars 37 pivoted into closing position in which their hook shaped ends enter the recesses of the fingers 47 which extend upwardly from the fuel element head 14.

Now, the lifting movement is initiated by turning on the winch drive motor so that the cables 1 become taut and the load receiving body 5 is lifted. According to FIG. 3, in this connection, the shift-over valve 29 is first so set that the air of 6 atmospheres above atmospheric pressure which prevails in the lower portion of the cylinder 25 has the tendency to keep the piston 24 in its upper end position. However, it would also be possible that the switch-over valve 29 is shifted immediately. In such an instance, the piston 24 would move downwardly in view of the compressed air of 6 atmospheres above atmospheric pressure acting upon the upper side of piston 24, aided by the spring 26. The cable 64 would become slack as long as yoke 62 has not reached its upper end position. This occurs only in the condition illustrated in FIG. 4. It will be appreciated that when lifting the load receiving body 5, the latter is followed by the gripper housing 7 only with delay. This is due to the fact that during the upward movement of the piston 59 provided on the load receiving body, the air in the cylinder 58 is only slowly pressed out through the throttle member 68.

Figure 4A:
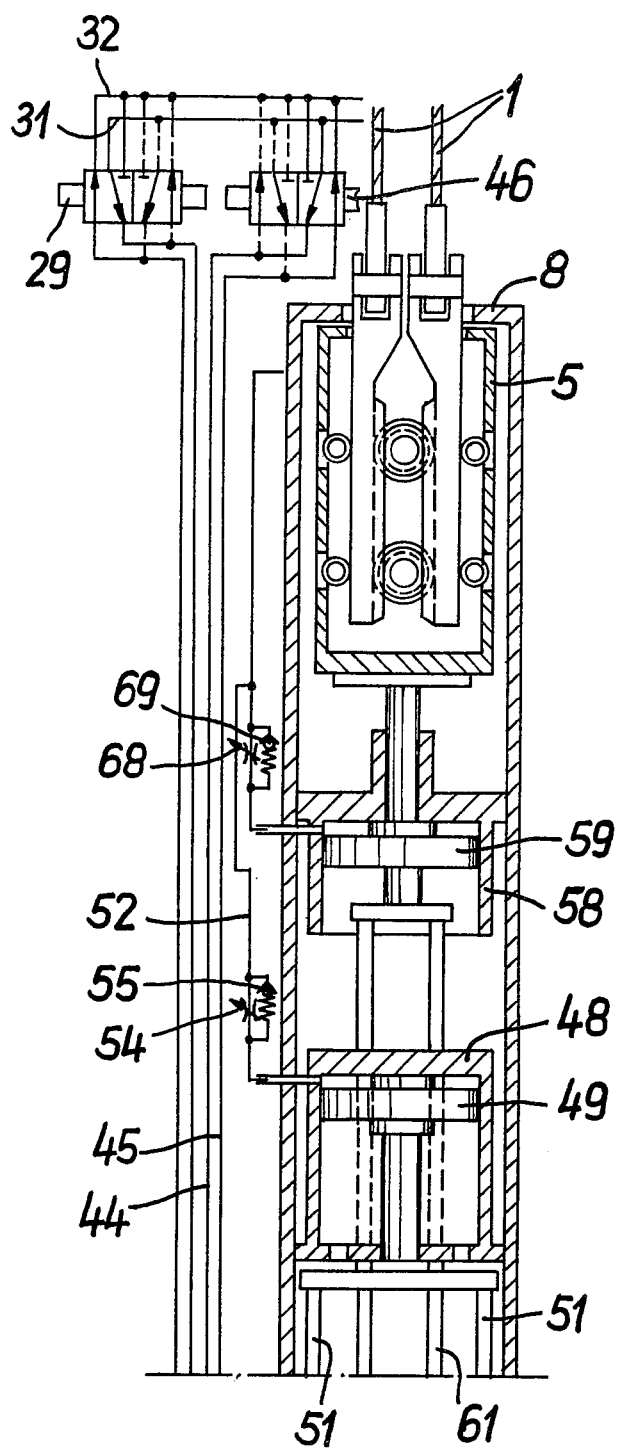
Figure 4B:
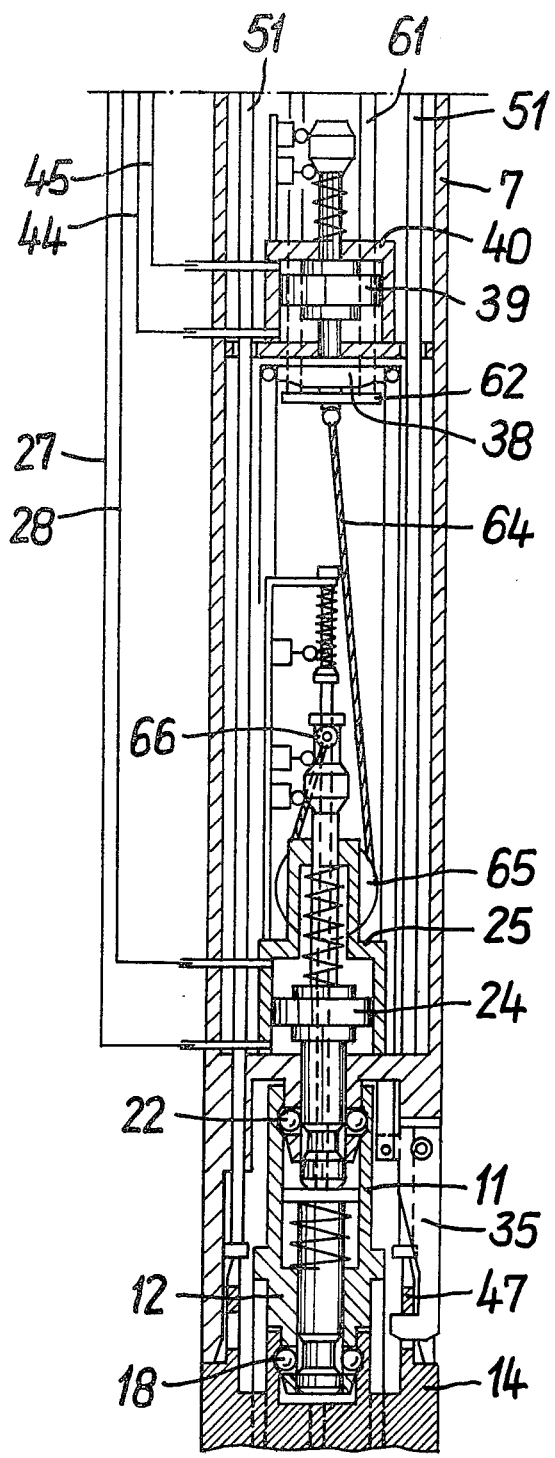

Only when piston 59 has reached its upper end position shown in FIG. 4, also the yoke 62 has reached its upper end position in which it engages the abutment 63 of the transverse head 38 located in its upper end position. Consequently, the yoke 62 blocks the fuel element gripper by preventing the transverse head 38 from moving downwardly. Consequently, the gripper pawls 35 are secured in their closing position.

At the latest, when the yoke 62 has reached its uppermost end position, the piston 24 must have entered its lower end position. This is automatically brought about by the connection of the two parts by means of cable 64. This downward movement of the piston 24 is effected after the switch-over valve 29 has been moved into its position shown in FIG. 4 in which through conduit 28 compressed air of 6 atmospheres above atmospheric pressure enters the upper portion of the cylinder 25, whereas air of 2 atmospheres above atmospheric pressure escapes from the lower cylinder portion through conduit 27. Compressed spring 26 aids the effect of the compressed air in the upper cylinder portion. Due to the downward movement of the piston 24 the rod gripper has been brought into its closing position by the control rod 21 having forced the supporting balls 22 into the annular groove 15. Furthermore, the rod 21 has pressed the piston 16 downwardly against the thrust of spring 20 so that the annular groove 19 has moved into a position opposite the supporting balls 18 whereby the clutch connection between the head 12 and the control bars 13 and the fuel element head 14 is disengaged.

Due to the described locking of the transverse head 38 it will be assured that the fuel element gripper remains in its engaging position so that an accidental dropping of the pulled-out fuel element from the gripper housing will for all practical purposes be impossible.

Figure 5A:
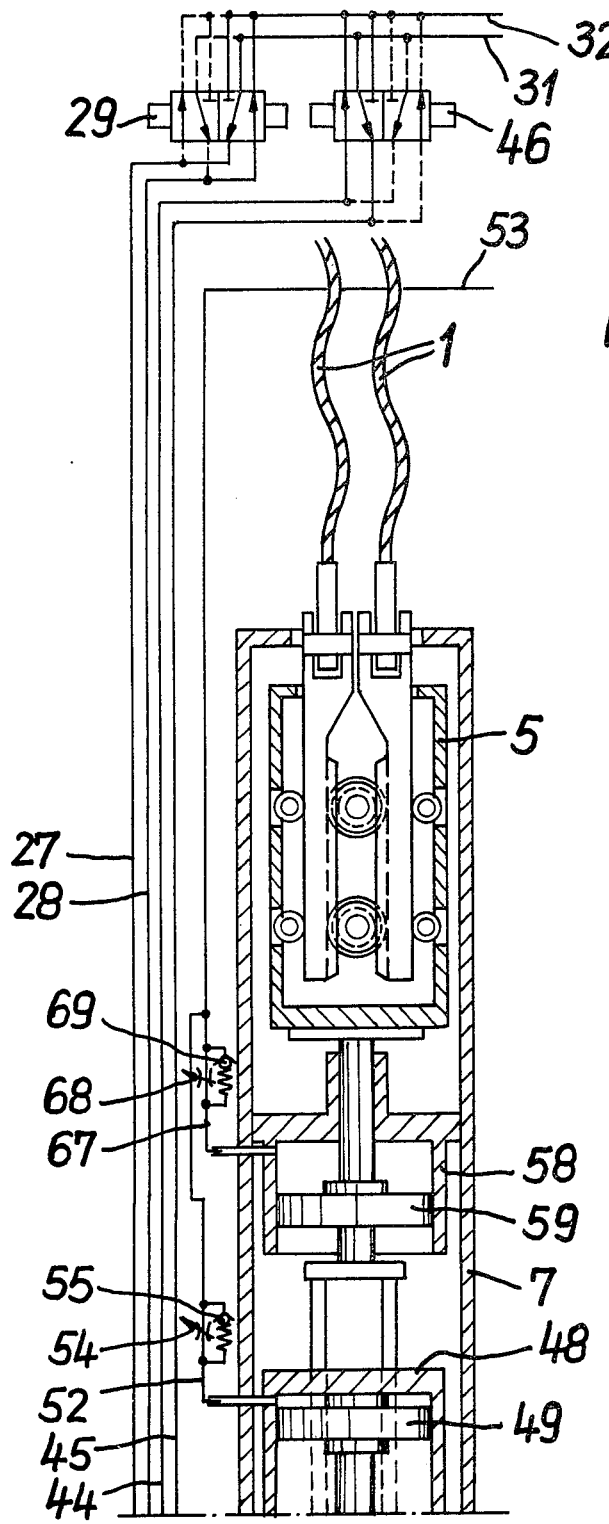
Figure 5B:
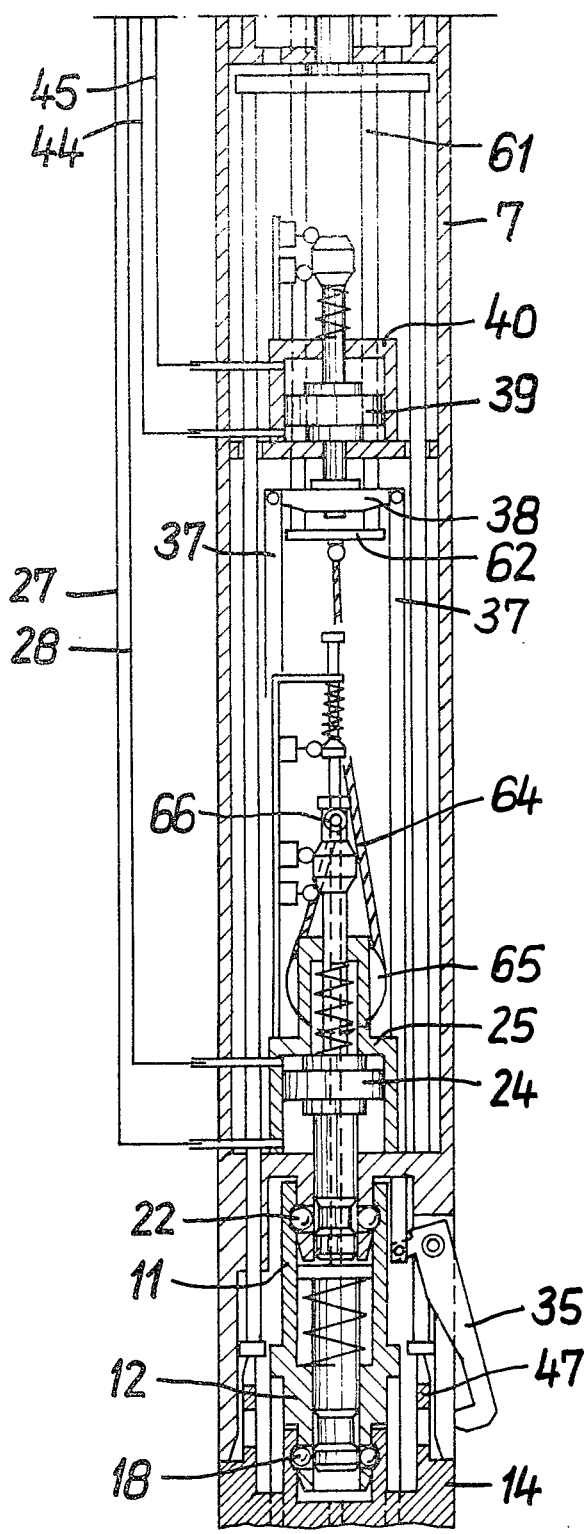

FIG. 5 shows how subsequently the fuel element has been inserted into a position opening for instance in a bearing frame or in a reactor core. There is obtained the same setting as according to FIG 2. The cables 1 have again slackened and the piston 59 has moved downwardly together with the load receiving body 5 so that the yoke 62 simultaneously moved downwardly will permit the movement of the transverse head 38 in downward direction and via cable 64 will permit or free the movement of the piston 24 in upward direction.

Accordingly, the gripper pawls 35 have been moved into releasing position. Also the rod gripper is released because the annular groove 23 of the control rod 21 has moved to a position opposite to the supporting balls 22. Simultaneously, the head 12 for the control bars 13 is coupled to the head 14 of the fuel element because due to the upward movement of the piston 16 under the influence of the pressure spring 20, the lower end of the control bar 17 has urged the supporting balls 18 into the annular groove 19.

Figure 6A:
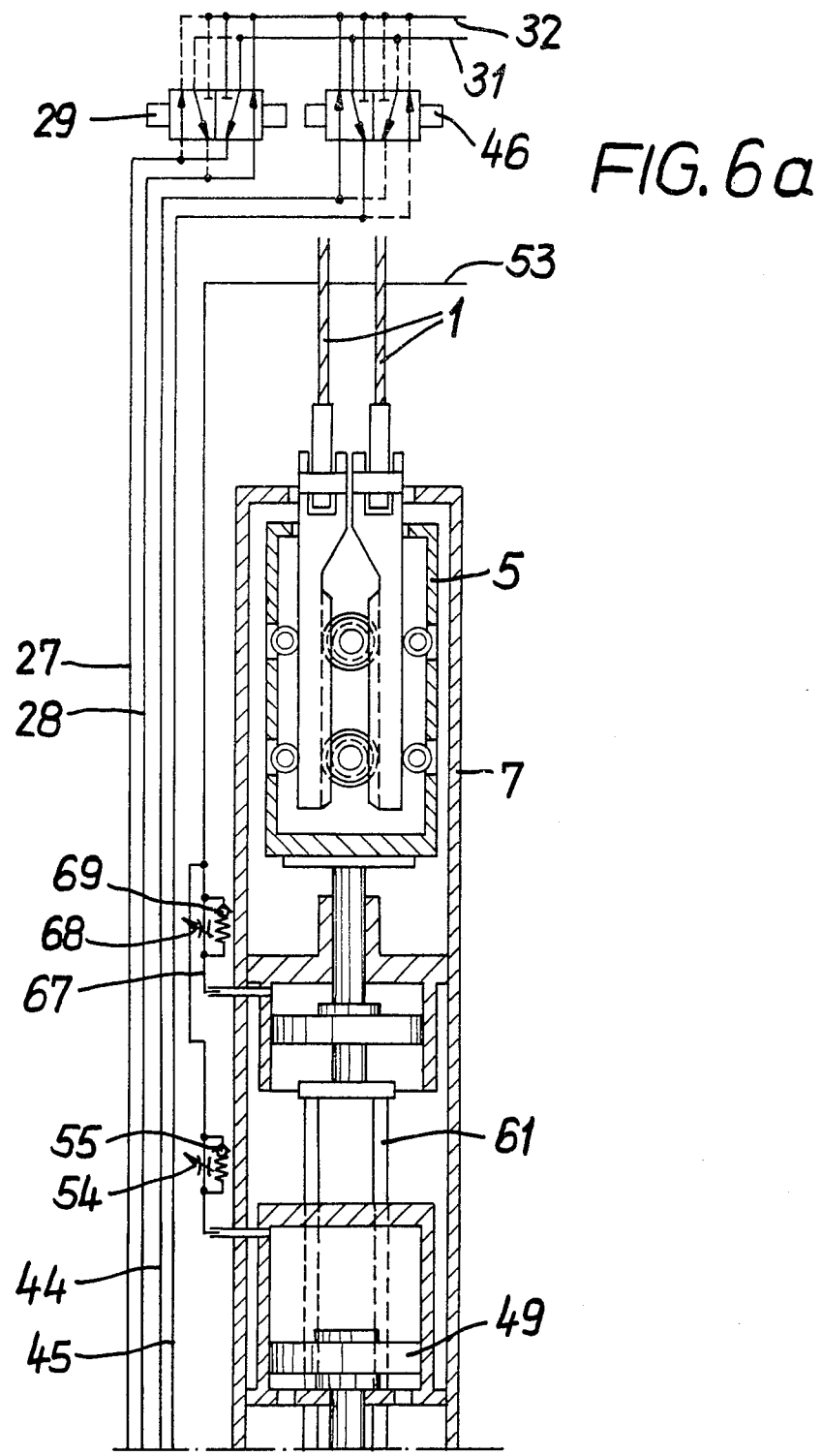
Figure 6B:
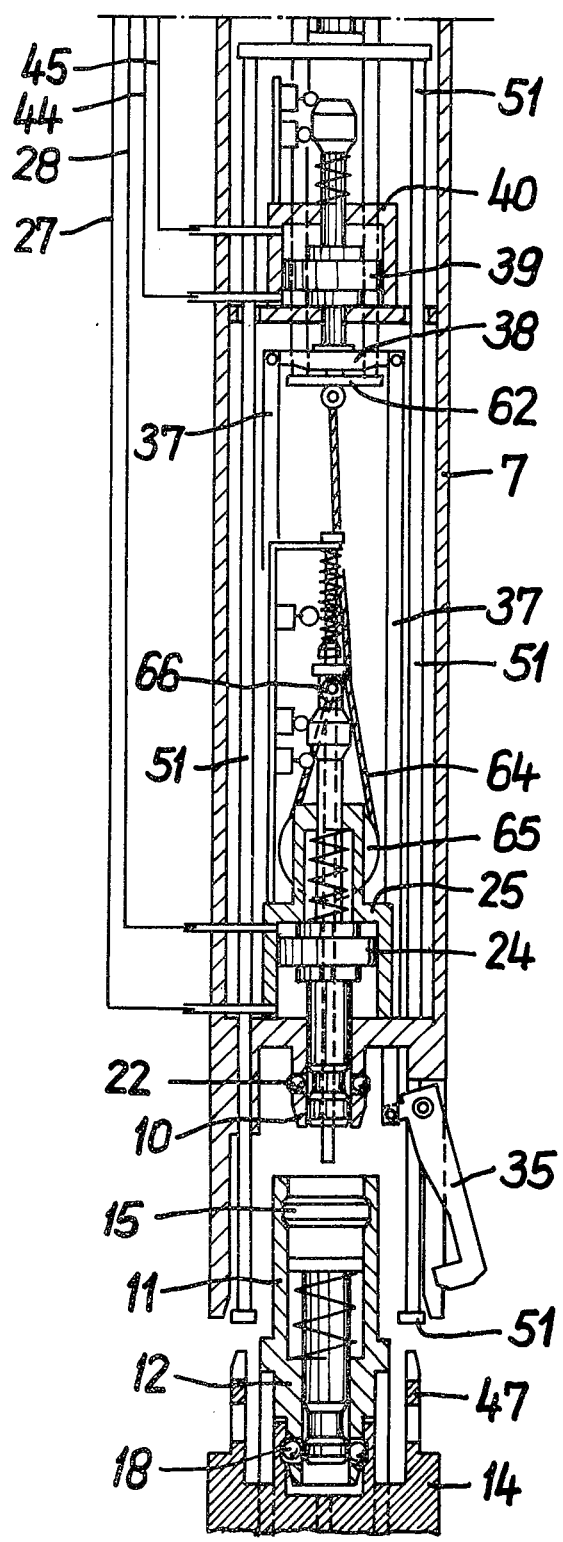

When subsequently, in conformity with FIG. 6, the gripper housing 7 is lifted off the fuel element head 14, first the cables 1 become taut and the load receiving body 5 is lifted with the piston 59. Due to the weight of the gripper housing 7 and the elements therein, air is only gradually pressed out of the upper portion of the cylnder 58 through the throttling member 68.

Consequently, yoke 62 moves only slowly upwardly relative to the gripper housing 7, and sometime passes by before the yoke 62 moves into the position of FIG. 4. During the time period which passes by, the fuel element grippers and the rod grippers remain in release position because the switch-over valves 29 and 46 have not yet been switched over. Thus, the gripper pawls 35 are held in spread position and the control bar 21 is held in its upper end position. Consequently, the gripper pawls 35 and the pivot 10 of the rod gripper is lifted off the fuel element head 14 and out of the sleeve 11 of the rod head 12. Only thereafter, will the fuel element gripper and the rod gripper move to the closing positions because the piston 59 eventually moves to its upper end position in cylinder 58, and consequently the yoke 62 is lifted into its blocking position.

Figure 7A:
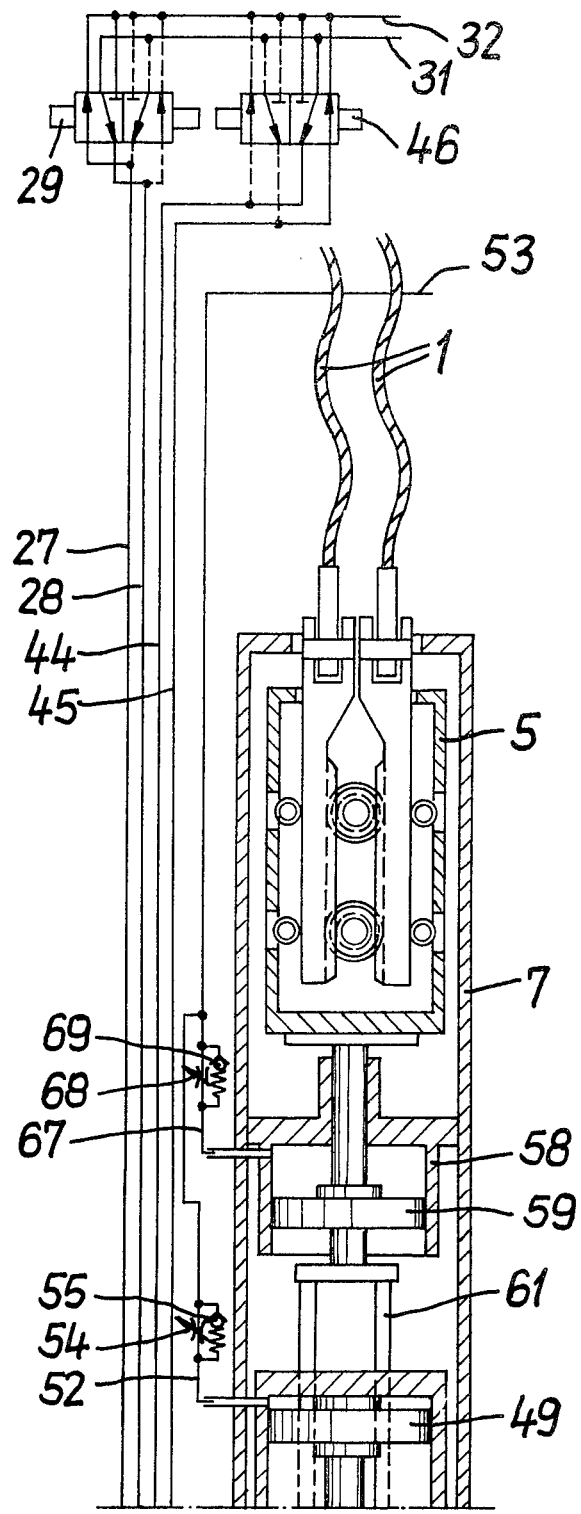
Figure 7B:
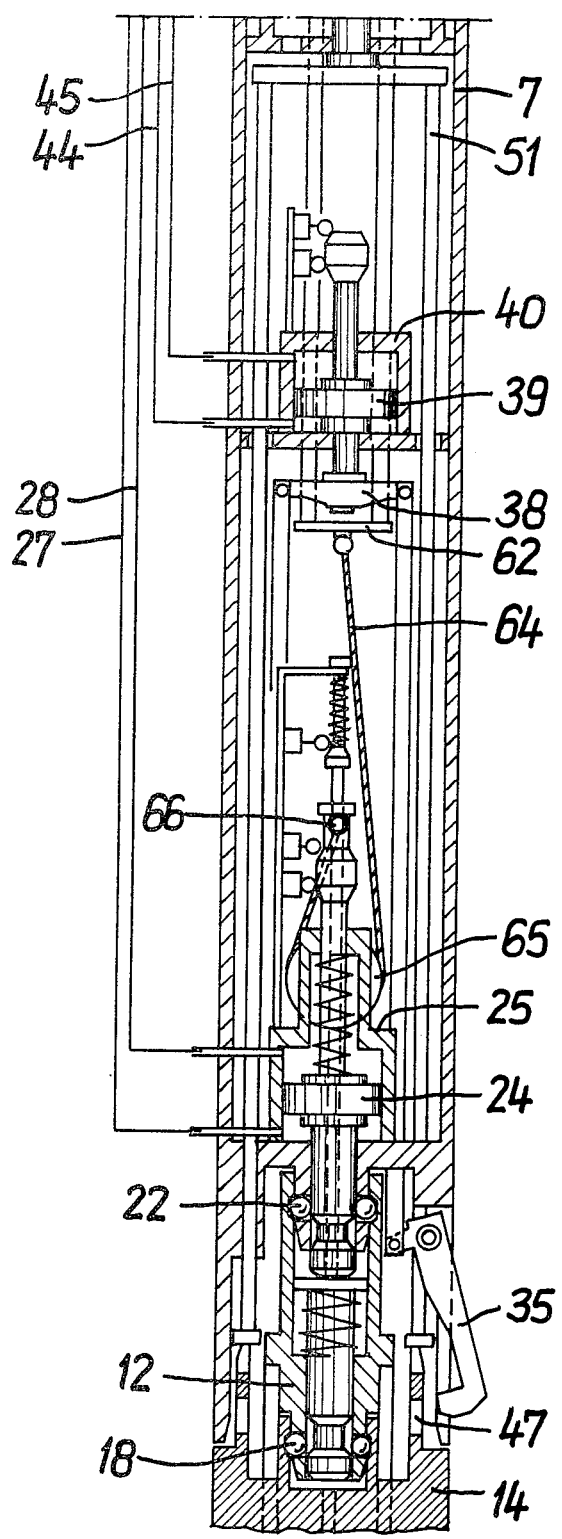

When it is desired to pull the control bars 13 with head 12 out of the fuel elements, the gripper housing 7 is in the same manner as illustrated in FIG. 2, according to FIG. 7 placed upon the fuel elements head 14. In this condition, the cables 1 are slacked so that the load receiving body 5 with the piston 59 has moved downwardly relative to the gripper housing 7, and yoke 62 has moved to its releasing position.

Since the reversing valve 46 remains further in its opening position, air of 6 atmospheres above atmospheric pressure acts from conduit 28 onto the top side of piston 39 so that the piston 39 has moved downwardly and the gripper pawls 35 are spread. However, the switch-over valve 29 has moved to its closing position so that the pressure of 6 atmospheres above atmospheric pressure acts upon the top side of the piston 24 of the rod gripper, and the control bar 21 is moved into closing position 7 in which the control bar 21 pressses the supporting balls 22 into the annular groove 15 of the sleeve 11 so that the coupling connection between the gripper housing 7 and the head 12 of the control bars 13 is established. Simultanaeously, the control bar 21 has pressed the piston 16 downwardly so that the annular groove 19 of the control bar 17 has moved into a position opposite the supporting balls 18. In this way, the coupling connection between the head 12 of the control bars 13 and the fuel element head 14 is disengaged.

If now the load receiving body 5 is lifted by means of the cable 7, according to a certain delay, has been brought about by the flowing out of air from the cylinder 58 through the throttle valve 68, the gripper housing 7 is likewise lifted. In this way the head 12 is lifted which is coupled by the rod gripper to the gripper housing 7. As a result thereof, the control bars 13 are pulled out of the bores in the fuel element.

In this connection it will be assured that the coupling connection of the rod gripper cannot accidentally be disengaged. It will be appreciated that in view of the relative movement of the load receiving body 5 and of the piston 59 relative to the gripper housing 7 in upward direction, the yoke 62 has moved to its upper end position, in which through the intervention of cable 64 it holds the piston 24 of the rod gripper automatically in its lower end position.

Figure 8A:
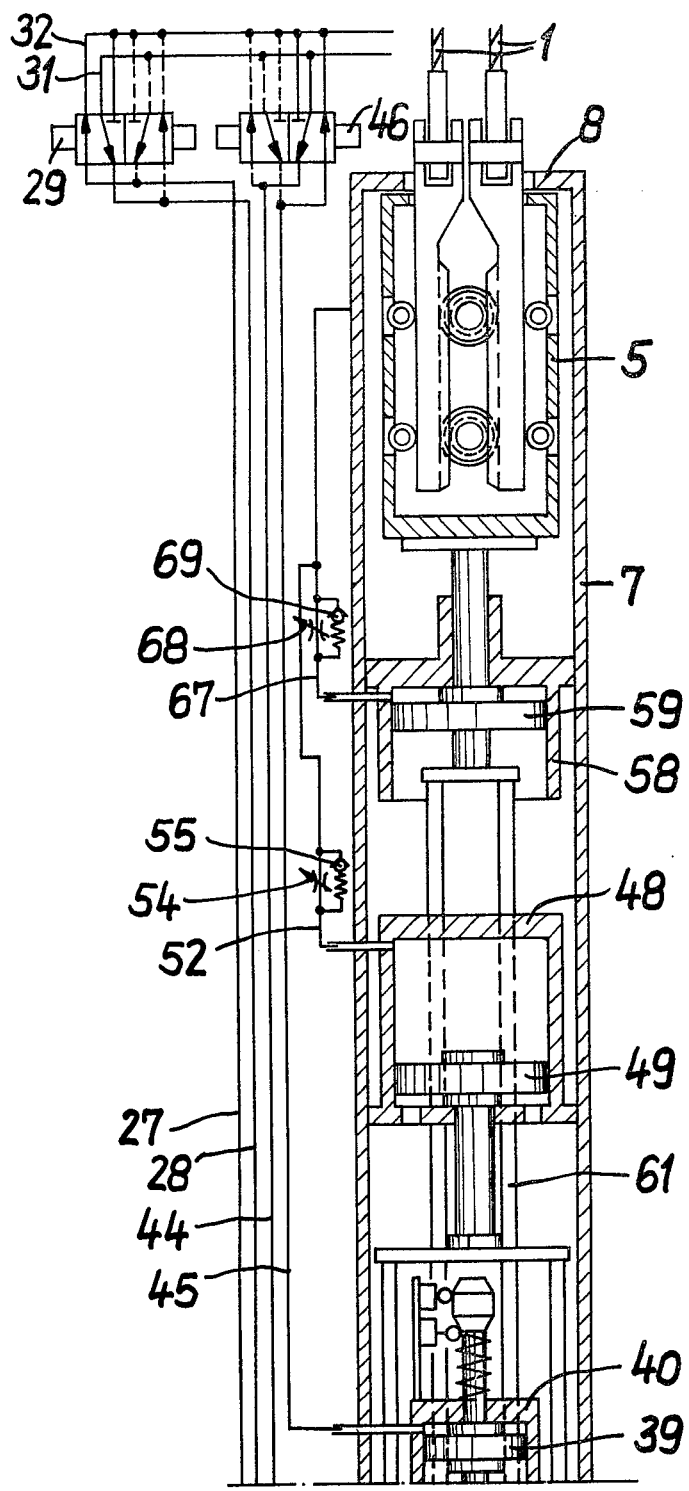
Figure 8B:
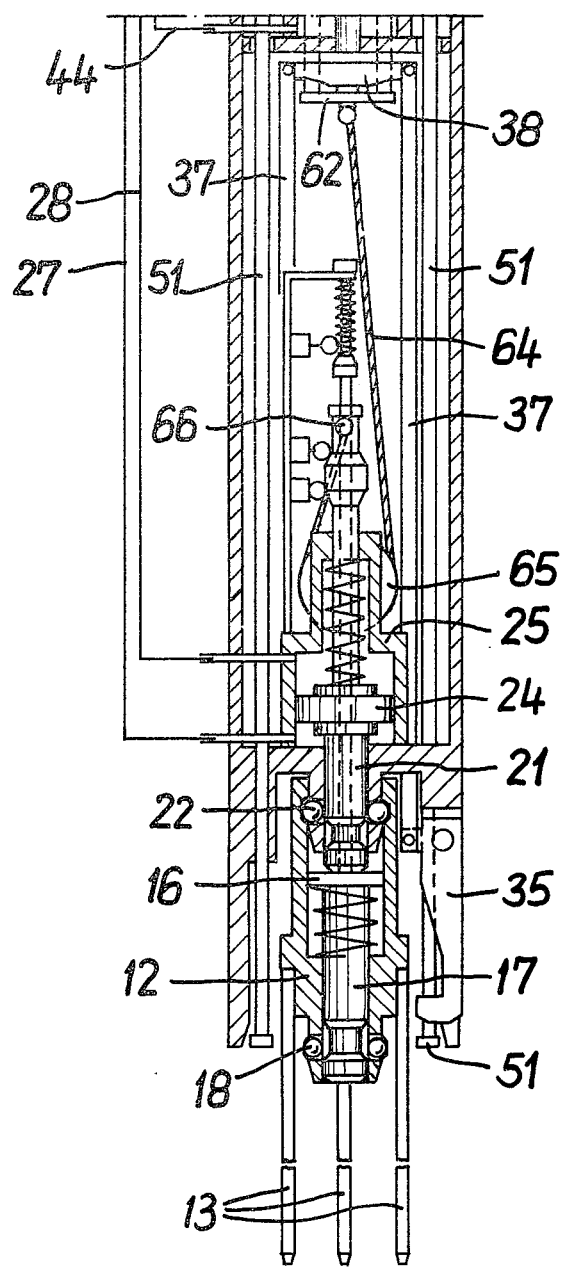

In this connection, the transverse head 38 the abutment 63 of which is engaged by yoke 62 had to move to its uppermost end position which fact is inherent to a pivoting of the gripper pawls 35 to their closed position. This, however, happens only after the above mentioned delay which is caused by the escape of air from the cylinder 58 through the throttling member 68 so that the gripper pawls 35 will reach the position shown in FIG. 8 only when they have meen moved past the fingers 47 of the burner element head 14. The movement of the piston 39 of the burner element gripper in upward direction is brought about by the fact that the reversing valve 46 is brought into its closing position. This upward movement of piston 39 is aided by the compression spring 42.

Figure 9A:
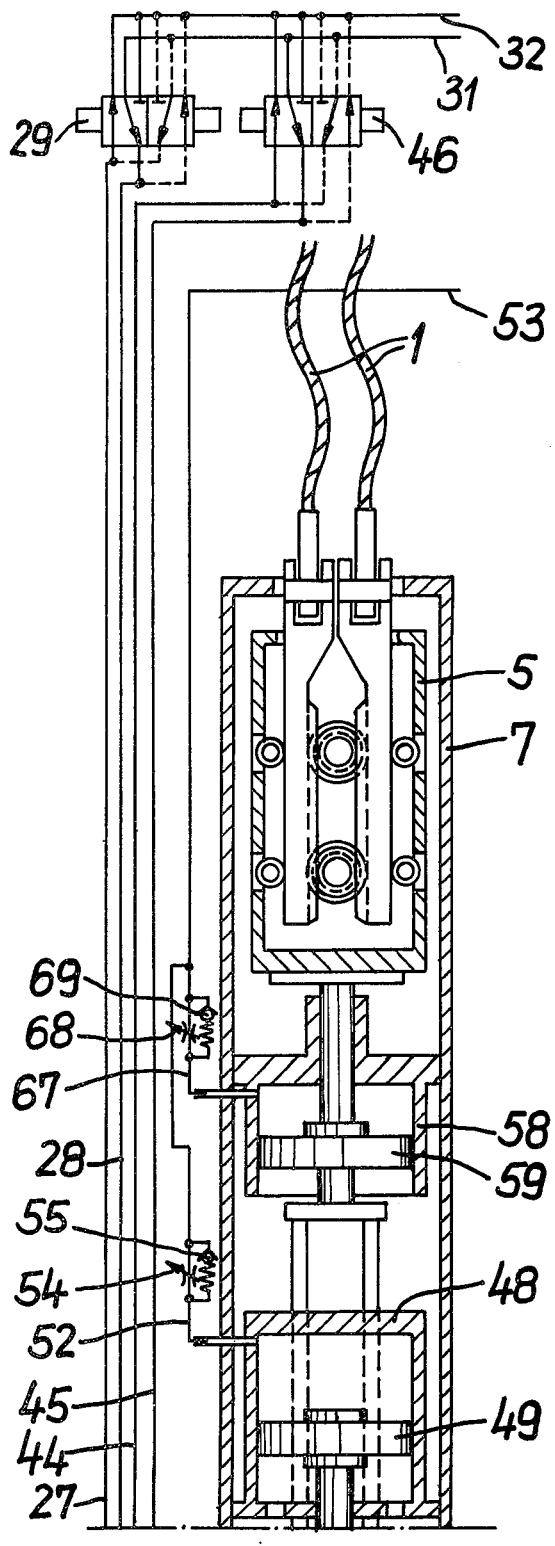

FIG. 9 shows how the control bars 13 suspended on the gripper housing 7 have moved to a major extent into position bores for instance of a fuel element mounted in a bearing frame or a reactor core. However, the gripper housing 7 has not yet finally desposited upon the fuel element head 14. Only the feelers 51 have abutted the fingers 47 and thus act as supports for the gripper housing so that the gripper housing can move downwardly only very slowly relative to the piston 49 which is supported by the elements 51. This is due to the fact that the exit of air from the upper portion of the cylinder 48 is delayed by the throttling member 54. This is due to the release of cables 1 brought about by the fact that the discharge of air from the upper portion of the cylinder 48 is delayed by the throttling member 54. Due to the thus effected release, the grippers become slack. Consequently, the load receiving body 5 with the piston 59 moves downwardly relative to the supported gripper housing 7 so that the yoke 62 moves into its releasing position. Shortly prior thereto, the switch-over valve 46 has been moved to its opening position so that now the piston 39 of the fuel element gripper is against the thrust of spring 42 moved downwardly by the pressure of 6 atmospheres in the upper portion of the cylinder 40. Consequently, the gripper pawls 35 are spread so that during the further lowering of the gripper housing they will not collide with the fingers 47.

The switch-over valve 29 first remains in its closing position so that the head 12 for the control bars 13 remains in coupling engagement with the gripper housing 7.

Figure 10A:
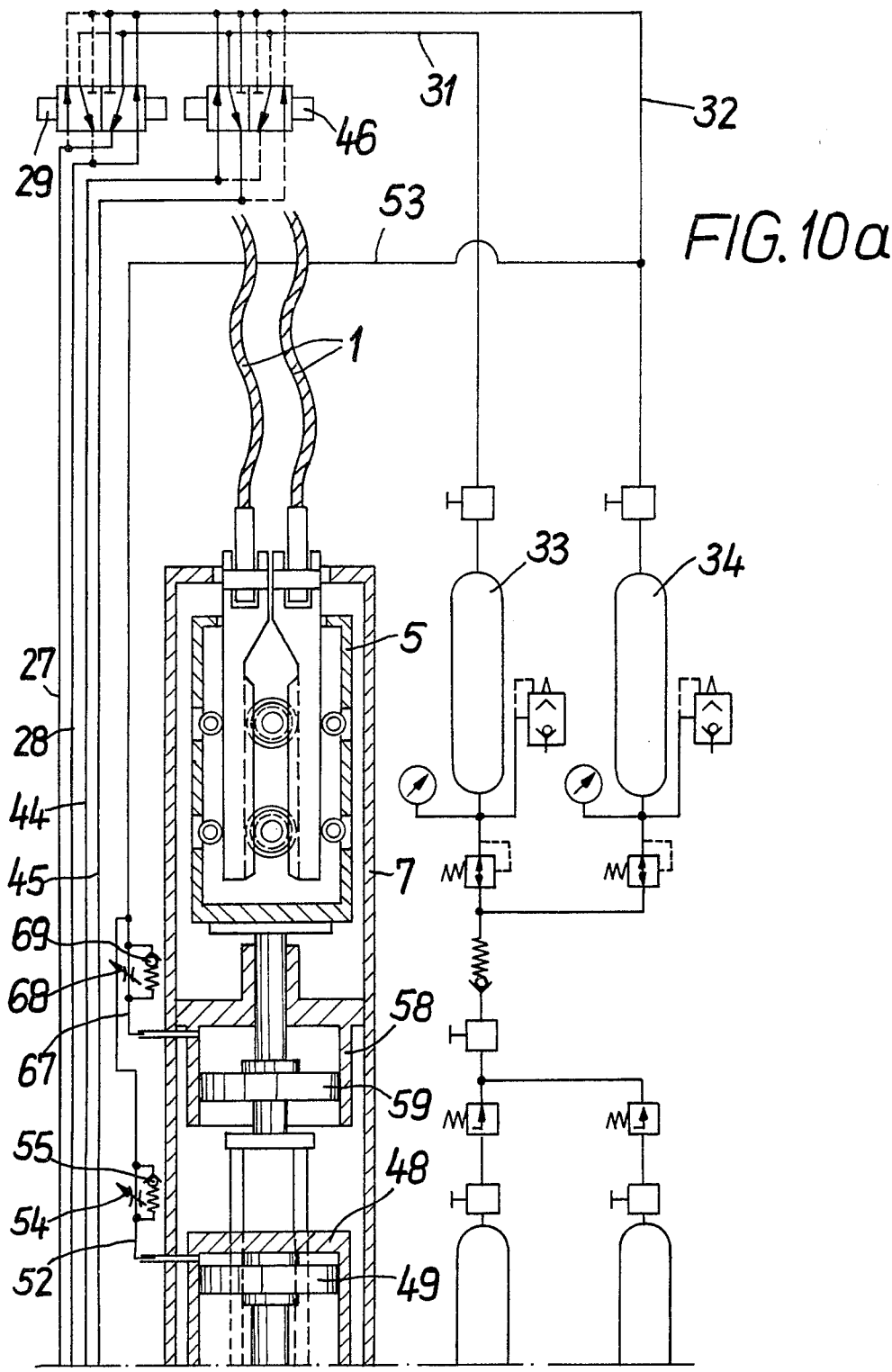
Figure 10B:
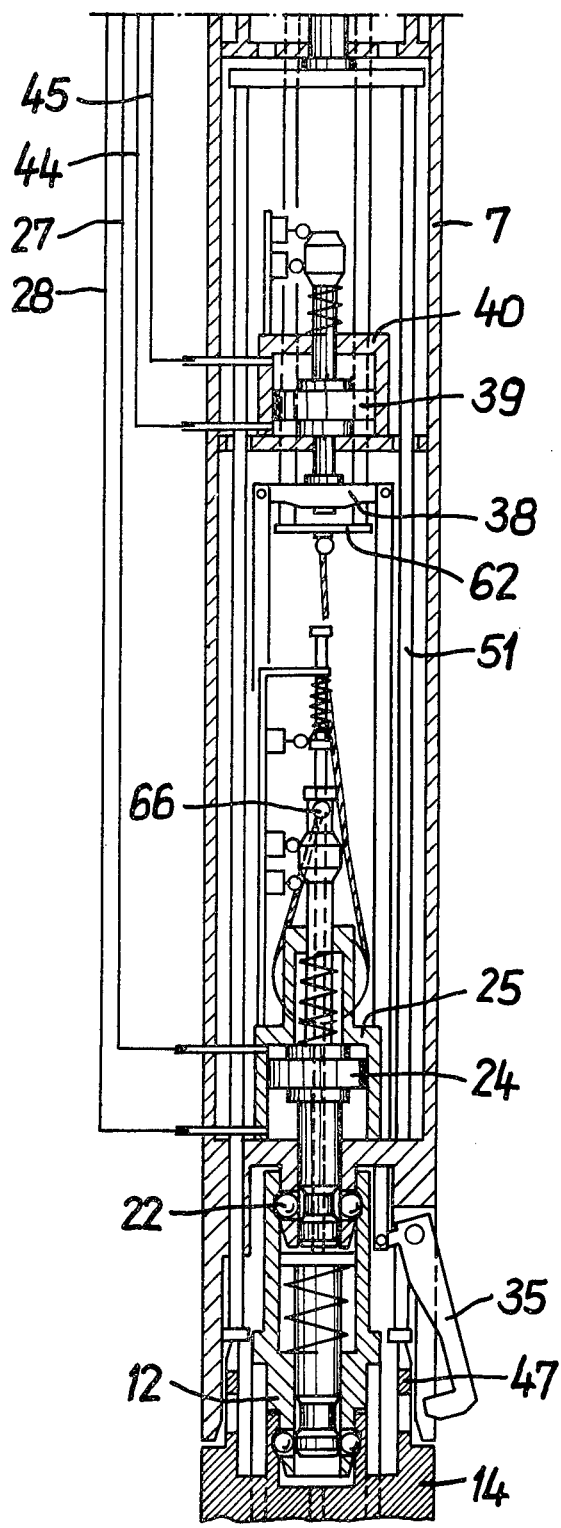

FIG. 10 shows finally the gripper housing 7 is completely places upon the burner head element 14 after the air in cylinder 48 was discharged in a delayed manner by the piston 49.

Now also the switch over valve 29 is moved into its opening position so that the piston 24 of the rod gripper is moved upwardly while the previously slackened cable 64 again becomes taut. In this way the coupling connection between the head 12 and the gripper housing 7 is disengaged and simultaneously the coupling connection between the head 12 and the burner element head 14 is established because the supporting balls 18 are pressed by the lower end of the control rod 17 into the annular groove 19. Now the gripper housing can be lifted off the head 12 of the control bar 13 and of the fuel element head 14.

It is, of course, to be understood that the present invention is, by no means, limited to the specific showing in the drawings but also comprises any modifications within the scope of the appended claims.

What is claimed is:

1. A device for use in gripping and axially moving elongated bodies, especially the fuel elements and the control bars in a core reactor, comprising:
   a. a lift mechanism,
   b. a load supporting body suspended from said lift mechanism,
   c. a gripper housing enclosing said load supporting body and having lost vertical motion connection with it,
   d. first and second gripper means arranged on the lower end of said gripper housing each having gripping and release positions,
   e. a first cylinder arranged within said gripper housing near the lower end of it,
   f. a first piston reciprocable in said first cylinder and connected to a first rod pertaining to said first gripper means,
   g. a second cylinder arranged within said gripping housing higher than said first cylinder,
   h. a second piston reciprocable in said second cylinder and connected by second rod means to said second gripper means,
   i. said first piston and said second piston can be actuated by pressure fluid each at least in one direction corresponding to the adjustment of said first gripper means and of said second gripper means into said release positions relatively and can be adjusted at least by spring means each in the opposite direction,
   k. a blocking means connected to said load supporting means by third rod means and arranged in such a manner that it blocks said first and said second piston in
   l. such positions in which said pistons hold said first gripper means and said second gripper means respectively in their gripping positions,
   m. feeler means which are guided axially reciprocable in said gripper housing between a lower position and an upper position and which in said lower position is so arranged that when said gripper housing is lowered said feeler means engages a supporting means prior than said gripper housing engages another supporting means which said supporting means are connected to a bearing means which receives said elongated bodies before these bodies will be gripped and moved upwards,
   n. said feeler means being fixed to a third piston reciprocable in a third cylinder arranged in said gripper housing,
   o. said third cylinder is filled above said third piston with fluid and connected to a fluid source by a pipe which includes means for retarding flow of fluid from said third cylinder to said fluid source, but for permitting free flow of fluid from said fluid source to said third cylinder.

2. A device according to claim 1, in which said third rod means is fixed to a fourth piston reciprocable in a fourth cylinder arranged in said gripper housing said fourth cylinder is filled above said fourth piston with fluid and connected to a fluid source by a pipe which includes means for retarding flow of fluid from said fourth cylinder to said fluid source, but for permitting free flow of fluid from said fluid source to said fourth cylinder.

3. A device according to claim 1, in which said blocking means consists of a first abutment which is fixed to said third rod means and is arranged beneath a second abutment fixed to said second piston and of a motion reversing means connected to said first abutment on the one hand and to said first piston on the other hand.

4. A device according to claim 3, in which said motion reversing means comprises a cable having one end connected to said first abutment and the other end connected to said first piston and entrained about a reversing pulley journalled in said gripper housing.

* * * * *